(12) United States Patent
Kaiser et al.

(10) Patent No.: US 11,203,222 B2
(45) Date of Patent: Dec. 21, 2021

(54) MARKER, STYLUS AND ERASER HOLDER

(71) Applicant: WRIGO LLC, Chicago, IL (US)

(72) Inventors: John A. Kaiser, Chicago, IL (US); Aldis Rauda, Des Plaines, IL (US)

(73) Assignee: WRIGO LLC, Chicago, IL (US)

( * ) Notice: Subject to any disclaimer, the term of this patent is extended or adjusted under 35 U.S.C. 154(b) by 0 days.

(21) Appl. No.: 16/415,928

(22) Filed: May 17, 2019

(65) Prior Publication Data

US 2020/0009900 A1    Jan. 9, 2020

Related U.S. Application Data

(60) Provisional application No. 62/673,016, filed on May 17, 2018.

(51) Int. Cl.
| | |
|---|---|
| *B43K 23/008* | (2006.01) |
| *B43K 23/06* | (2006.01) |
| *B43K 29/02* | (2006.01) |
| *B43K 29/04* | (2006.01) |
| *G06F 3/039* | (2013.01) |

(52) U.S. Cl.
CPC ............ *B43K 23/008* (2013.01); *B43K 23/06* (2013.01); *B43K 29/02* (2013.01); *B43K 29/04* (2013.01); *G06F 3/039* (2013.01)

(58) Field of Classification Search
CPC ...... B43K 23/00; B43K 23/016; B43K 23/02; B43K 23/06; B43K 29/02; B43K 29/20; B43L 19/0056; B43L 19/0068; B43L 21/00; B43M 99/007

USPC .............................................. D19/77; 401/48
See application file for complete search history.

(56) References Cited

U.S. PATENT DOCUMENTS

| | | | |
|---|---|---|---|
| 1,176,909 A | 3/1916 | Lane | |
| 2,303,759 A * | 12/1942 | Pippin | B43L 21/00 15/244.4 |
| D311,421 S | 10/1990 | Mardock | |
| D359,482 S | 6/1995 | Huang | |
| 5,555,602 A * | 9/1996 | Leamond | B43K 23/008 15/428 |
| 5,627,348 A | 5/1997 | Berkson et al. | |
| 6,793,430 B1 * | 9/2004 | Liu | B43K 29/18 15/209.1 |
| 6,948,874 B2 * | 9/2005 | Roberson | B43L 19/0018 401/118 |
| 7,740,133 B2 * | 6/2010 | Lamas | A45C 11/36 206/214 |
| 10,239,344 B2 * | 3/2019 | Caffey | B43K 23/06 |
| 2005/0196221 A1 * | 9/2005 | Hawkins | B43K 23/001 401/131 |
| 2006/0165470 A1 * | 7/2006 | Gerules | B43K 27/08 401/18 |
| 2011/0038661 A1 * | 2/2011 | Giap | B43K 29/00 401/195 |

(Continued)

*Primary Examiner* — David P Angwin
*Assistant Examiner* — Bradley S Oliver
(74) *Attorney, Agent, or Firm* — Cohen IP Law Group, P.C.; Michael N. Cohen

(57) ABSTRACT

As device adapted to hold accessories is disclosed. The device may be adapted to hold one or more erasers, one or more markers, one or more styluses and other accessories. The one or more erasers may include an offset angle compared to the one or more markers. The one or more erasers and/or the one or more markers may be removable and interchangeable.

20 Claims, 13 Drawing Sheets

(56) References Cited

U.S. PATENT DOCUMENTS

2018/0009254 A1  1/2018  Green et al.

* cited by examiner

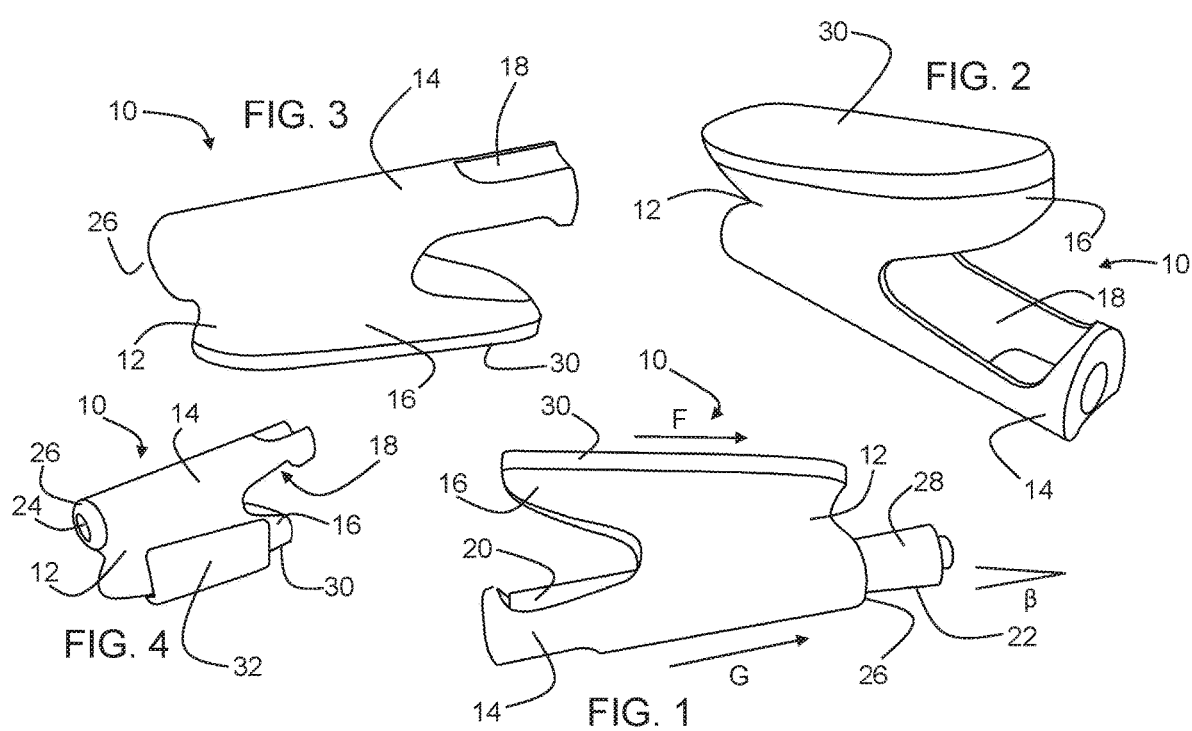

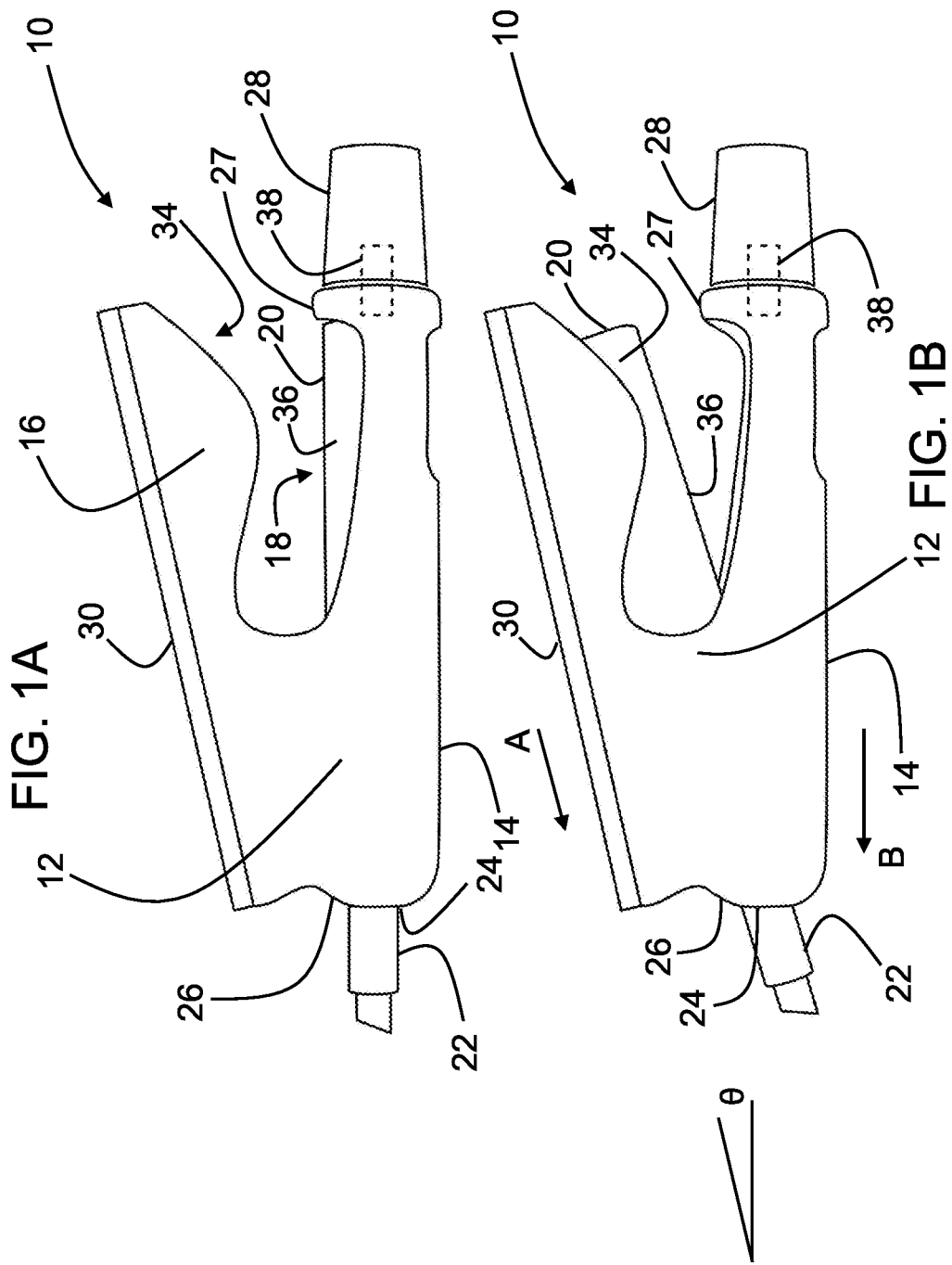

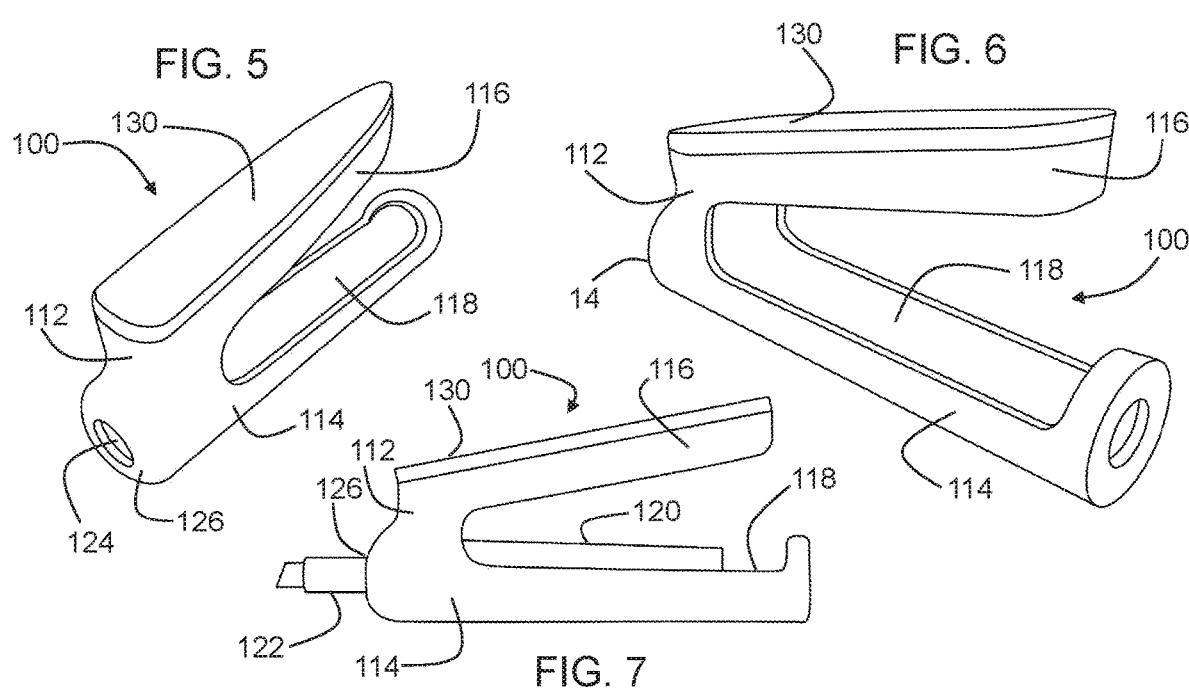

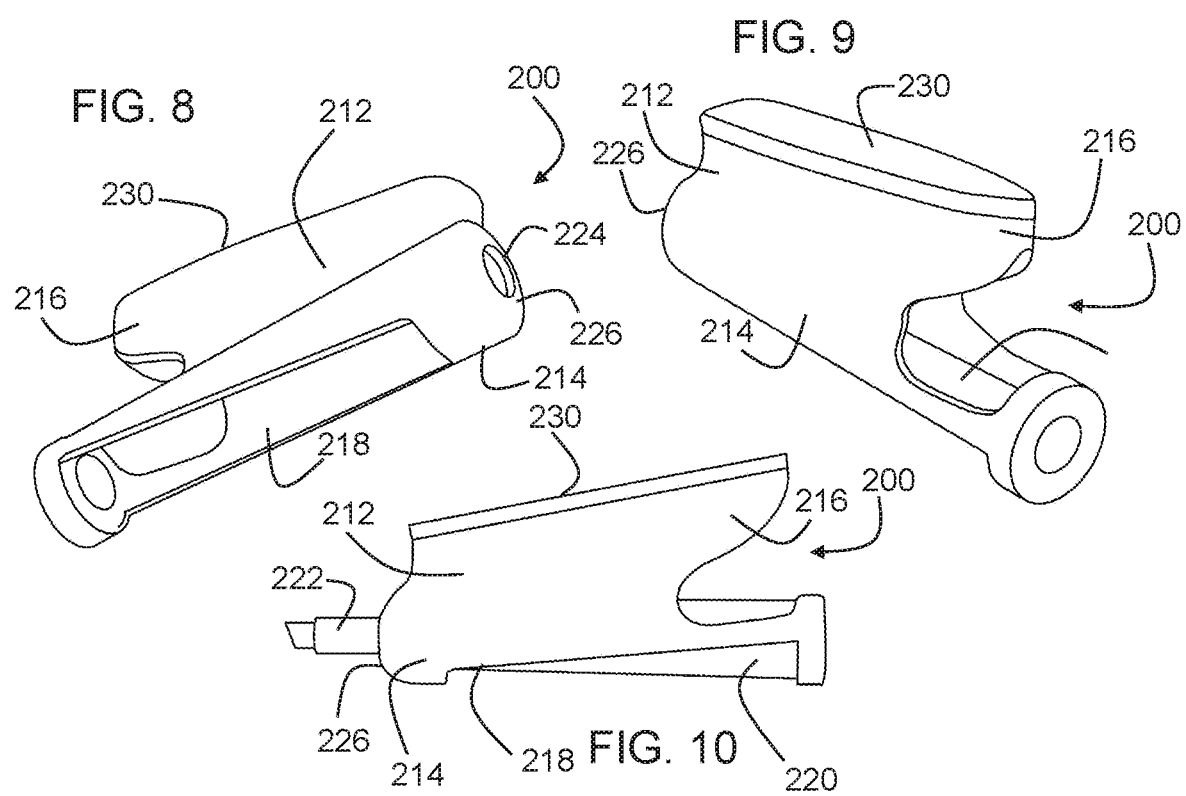

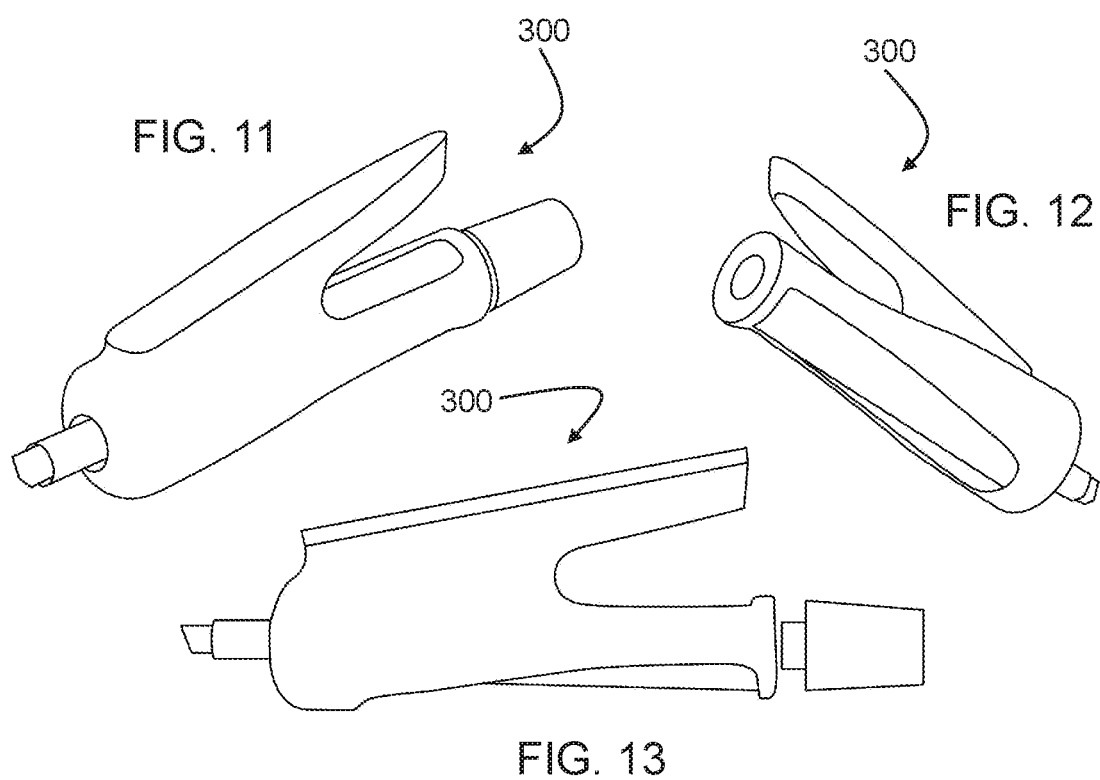

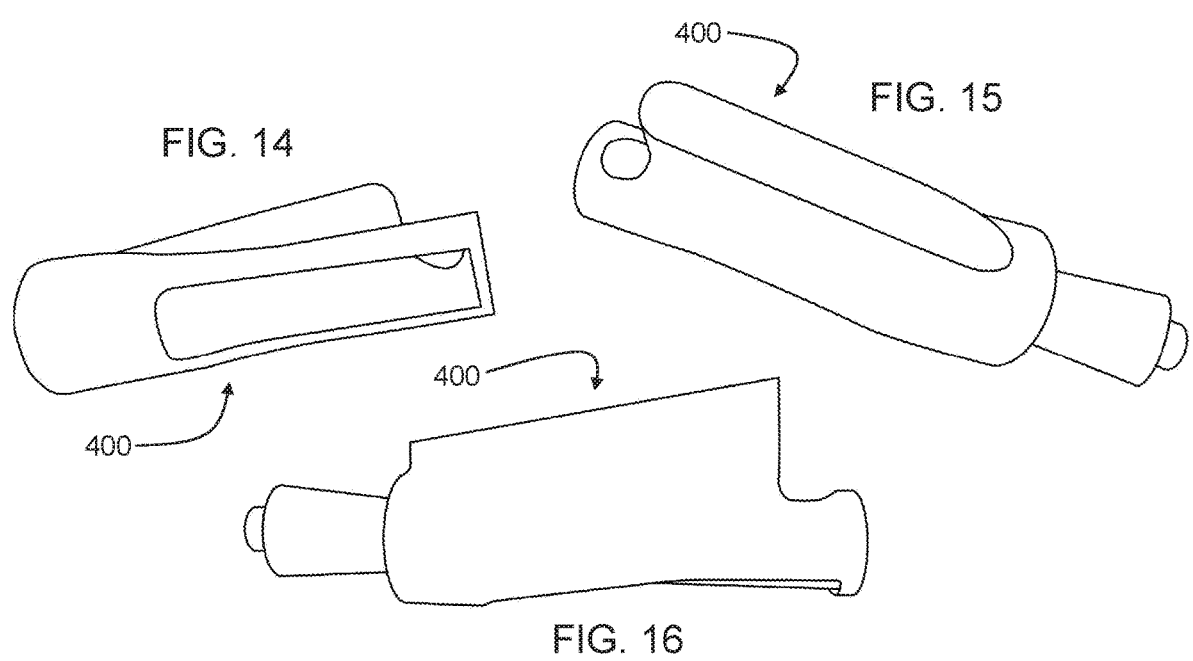

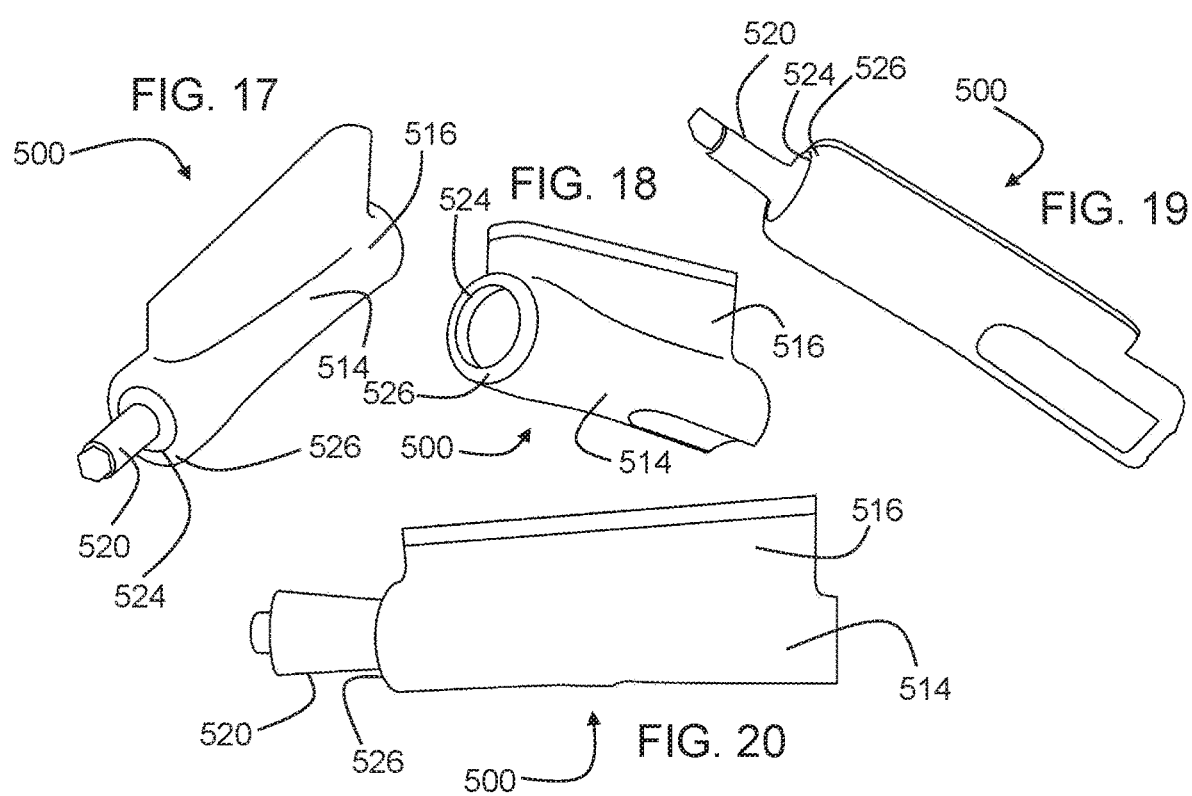

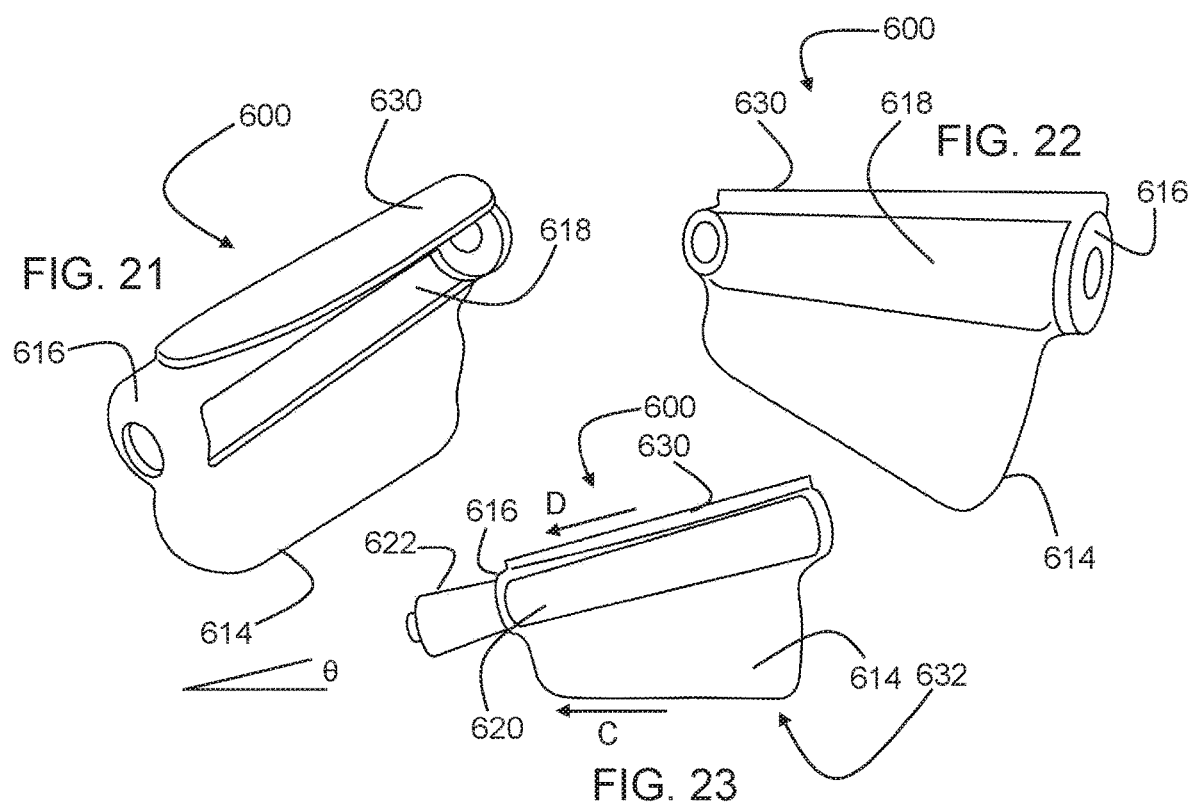

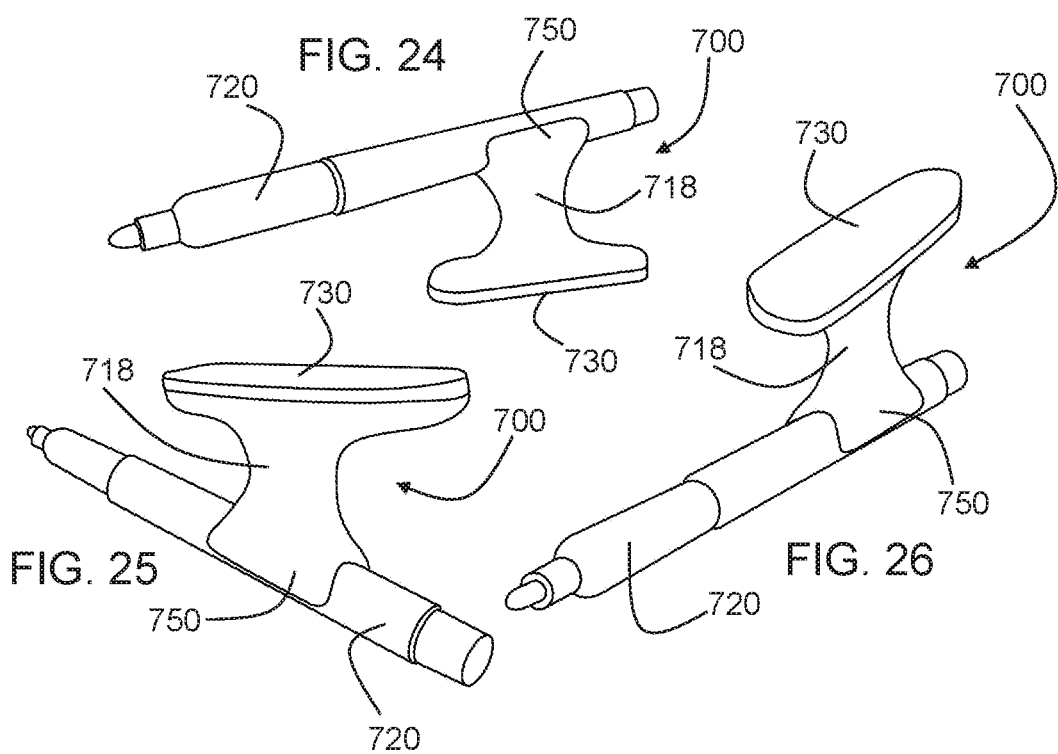

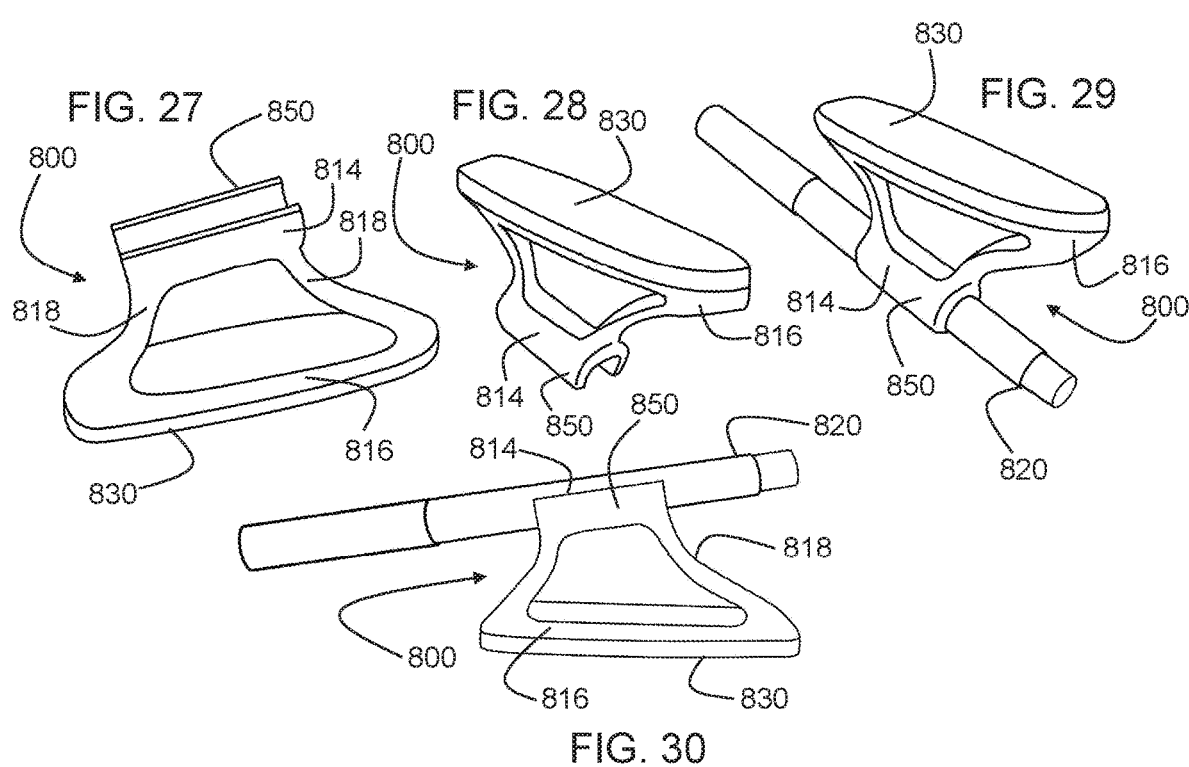

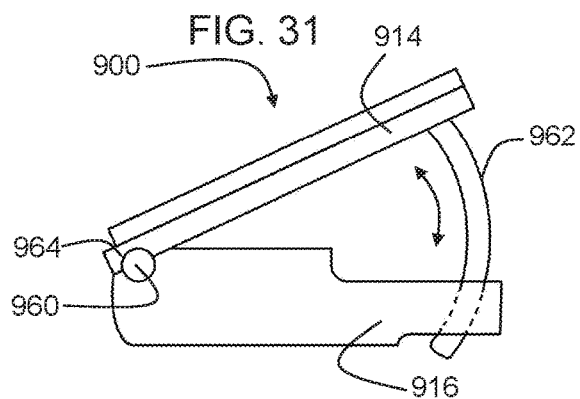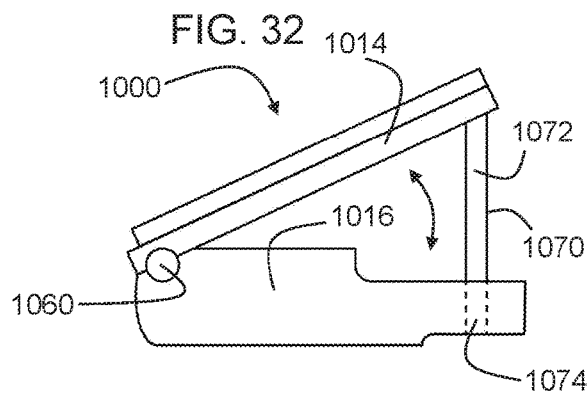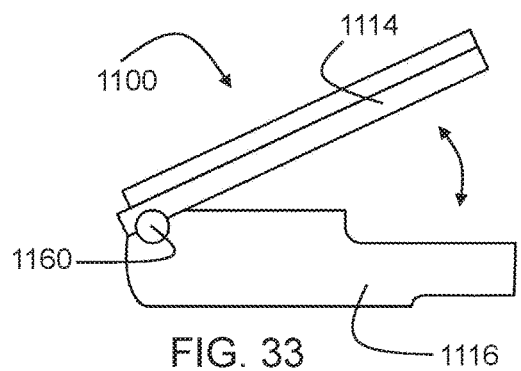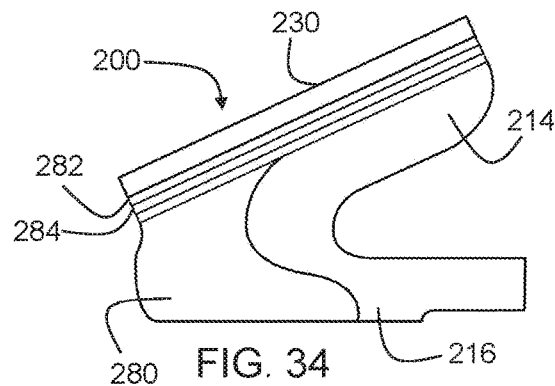

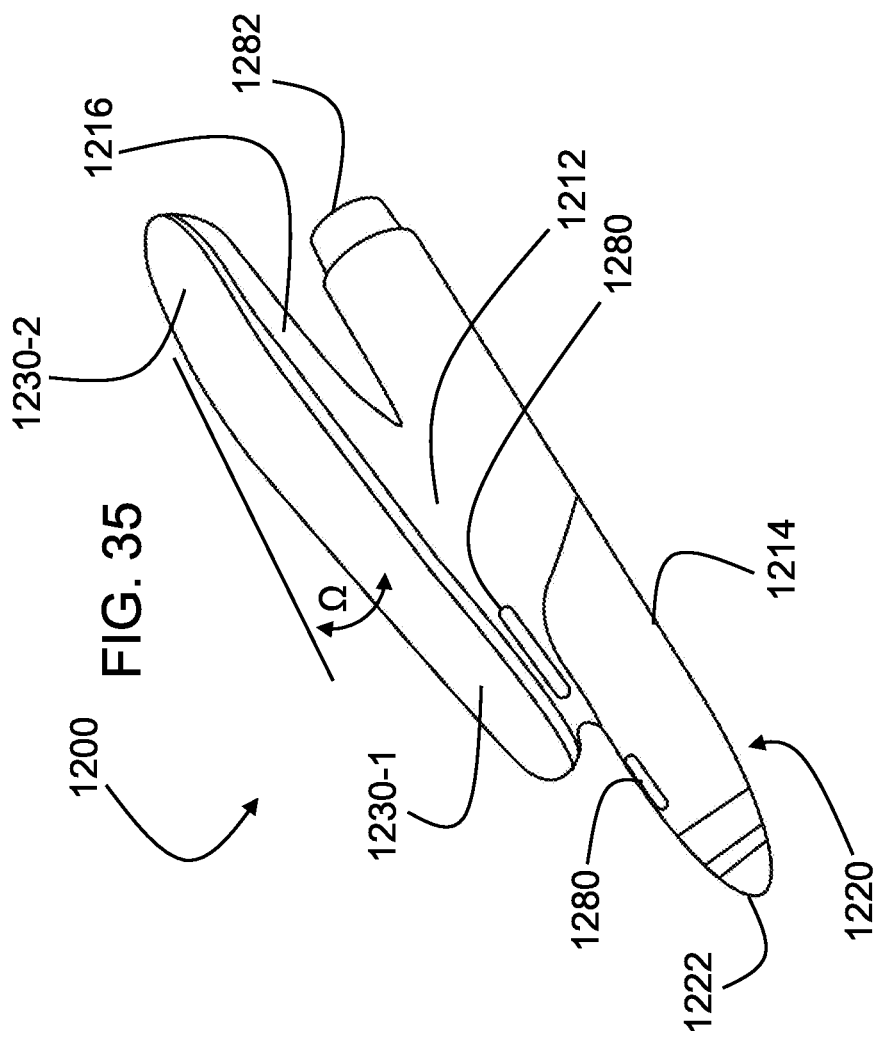

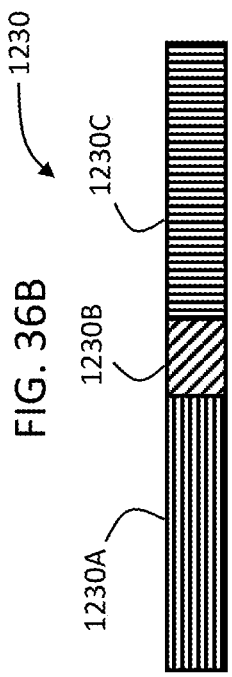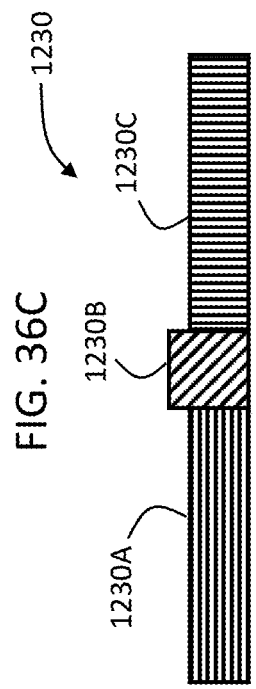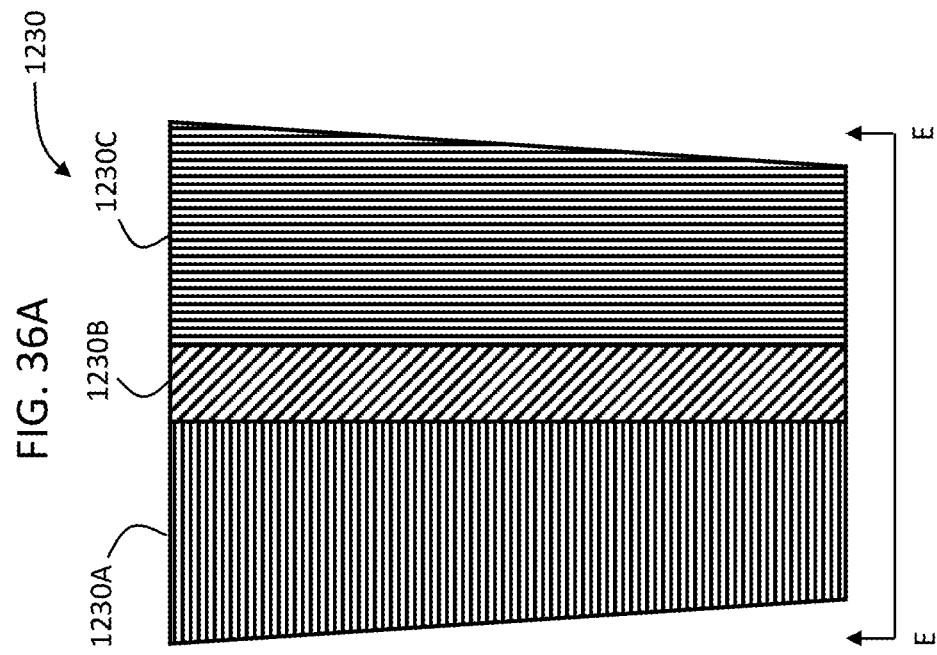

MARKER, STYLUS AND ERASER HOLDER

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

RELATIONSHIPS TO PRIOR APPLICATIONS

This application claims priority to U.S. Provisional Application No. 62/673,016, filed May 17, 2018, the entire contents of which are hereby fully incorporated herein by reference for all purposes.

FIELD OF THE INVENTION

This invention relates to writing and erasing devices, systems and methods of use, including writing and erasing devices for use with white boards (passive and/or active).

BACKGROUND

The present invention relates to a device for retaining a "writing" implement that can be used for writing on a "board" along with an associated "eraser". In one embodiment, the present invention relates to a holder for a dry-erase marker of the type commonly used to write on a whiteboard. The device includes a dry-erase marker, and/or means for holding a dry-erase marker, along with an eraser for a dry-erase marker, whereby a user can efficiently write on and/or erase from the whiteboard without putting the device down.

While some of the embodiments of the invention relate to dry-erase markers and dry-erase marker erasers, herein referred to as "markers" and "erasers", respectively, the invention also relates to traditional chalk, chalk erasers, and chalkboards, as well as electronic writing implements (e.g., styluses) with associated boards and erasers. Accordingly, while the description herein is directed primarily to dry-erase markers, other types of apparatus are also included in the scope of the invention.

As is generally known, a whiteboard is a glossy white surface that may be written on using a nonpermanent marker such that the writing may then be erased. Whiteboards are analogous to chalkboards, as they allow for quick writing and erasing on a relatively large scale. Typical whiteboards comprise laminated chipboard or a steel board that is covered in a polyester or acrylic coating. There are more expensive options which use enameled whiteboards, whereby they are less popular. Starting around the mid-1990s, whiteboards became more popular, because they allowed for the use of more vibrant colors than traditional colored chalk, and they also provide high contrast content.

Generally, whiteboards are easier to clean and leave little or no mess after use as compared to traditional chalkboards. This has led to a rise in whiteboard popularity in educational and working environments such as school classrooms, offices, and meeting rooms. To write on a whiteboard, a nonpermanent dry-erasable ("dry-erase") marker may be used. The whiteboard marker uses ink that adheres to the top layer of the whiteboard without binding or being absorbed, whereby it can be easily removed. While any cloth or sponge may be used to clean ink off a whiteboard, most whiteboards come with separate erasers, generally having a handle with a felt or other type of cloth attached to its underside, resulting in a lightweight eraser that does not tire the user even after performing frequent erasing motions. Nevertheless, traditional whiteboard erasers are separate items from the dry marker, whereby a user generally must either put down the marker or, alternatively, use both hands, with one hand erasing and the other writing.

In college classrooms, in particular, lecturers using whiteboards may often fill the available surface areas on the whiteboard(s) with notes, and as they then go back to reuse whiteboard spaces that have already been written on, they must "juggle" between using the eraser (to clear new space upon which they may write) and the dry-erase marker (to write on the newly erased spaces). The lecturer must put down the marker in order to pick up the eraser, and vice versa, thus spending additional time and effort. In addition, the eraser may not necessarily be near the lecturer in which case he/she must walk to retrieve it. And if he/she is not so inclined to do this, he/she may resort to using his/her hands to erase the board thus soiling their hands with ink.

Additionally, if the lecturer decides to use both hands to write and erase (e.g., one hand to hold the marker and one to hold the eraser), both hands may then be occupied so that he/she may not be able to use their hands for other purposes (e.g., holding books or notes, using a laser pointer, etc.).

Accordingly, there is a need for a device that may allow for a marker and an eraser to be used in tandem with a single hand, thus allowing the user's other hand to be free to perform other activities, limit time wasted, avoid use of hands to erase the board, and limit wasting tissues or other materials in the event an eraser cannot be found.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1-30 shows aspects of a holder according to exemplary embodiments hereof;

FIGS. 31-33 shows aspects of an adjustable holder according to exemplary embodiments hereof;

FIG. 34 shows aspects of a holder with a comfort grip according to exemplary embodiments hereof;

FIG. 35 shows aspects of a holder according to exemplary embodiments hereof; and FIGS. 36A-36C shows aspects of eraser materials according to exemplary embodiments hereof.

DETAILED DESCRIPTION OF THE EXEMPLARY EMBODIMENTS

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

In general, the current invention may include a device that may incorporate various accessories into a single unit. In one example, the accessories may include whiteboard accessories such as pens, markers, erasers and/or other accessories. In this example, one or more markers and/or one or more erasers may be held by the device to form a single handheld unit. In this way, the user of the device may write and erase with the same device. In another example, the system may include and/or hold one or more styluses and/or one or more erasers as a single unit. In another example, the holder may include and/or hold one or more sticks of chalk and/or one or more erasers as a single unit. It is understood that the examples described above are meant for demonstration and that the device may include and/or hold any number of different accessories and any combination thereof. It is also understood that the scope of the system is not limited in any way by the type or number of accessories that it may include and/or hold.

For the purposes of this specification, the device will be described as including and/or holding whiteboard accessories (e.g., markers, styluses, erasers, etc.). The whiteboards in the descriptions may include passive whiteboards and/or active whiteboards (also referred to as interactive whiteboards and/or monitors). It is understood that other types of boards (e.g., chalkboards) and/or other types of monitors (e.g., touchscreens) may also be included and are within the scope of the invention.

In one exemplary embodiment hereof as shown in FIGS. 1-4, the system 1 may include a dry-erase marker holder 10 as shown. The holder 10 includes a main body 12 having a lower, or "grip", portion 14 and an upper, or "eraser", portion 16. As illustrated, the grip portion 14 includes a holding element 18 such as an inner cavity or opening (e.g., a barrel-like cylindrical opening or other type of opening, cavity or holding element) into which a dry-erase marker 20 is received and retained (FIG. 1 shows the marker 20 held within the opening 18) with its tip (or writing) end 22 extending out of an opening 24 at one end (also referred to as the "tip end") 26 of the lower portion 14. As shown, the opening 18 may be configured with the top surface of the bottom portion 114. In this way the holder 10 may be a top-loading holder 10. However, it is understood that the opening 18 may be configured with any surface of the holder 10 or any combinations of surfaces of the holder 10. As illustrated, the tip end 22 of the marker 20 extends far enough out of the end 26 of the lower portion 14 that a cap 28 can be placed over the tip end 22 when the marker 20 is not in use so as to prevent the ink in the marker 20 from drying out.

The dry marker holder 10 includes an upper (or "eraser") portion 16 that joins the main body 12, preferably towards the tip end 26 of the lower portion 14. As illustrated in FIGS. 1-4, the upper portion 16 of the dry marker holder 10 includes or retains a dry marker eraser 30. As shown, the upper (or eraser) portion 16 joins the lower portion 14 of the main body 12 (e.g., towards the tip end 26) such that the eraser portion 16 has a slope of about 20 to about 45 degrees relative to the lower portion 14 of the main body. That is, the longitudinal axis F of the upper eraser portion 16 may be at an offset angle β with respect to the longitudinal axis G of the lower portion 14. This may allow for an easy and ergonomic transition between writing and erasing (e.g., may require only a slight bending of the wrist to transition between writing and erasing and vice versa). Note that other amounts of slope may also be used and that the scope of the holder 10 is not limited by the amount of slope (angle) between the lower portion 12 and the upper portion 16.

In the example above, because of the ergonomically sloped orientation between the lower portion 14 and the eraser portion 16 as described, the user may write on the whiteboard while holding the lower portion of the holder 10 and writing with the marker 20 (after removing the cap 28). Then, without putting the holder 10 down, the user may simply turn his/her wrist or arm to use the eraser 30 to erase existing marks from the whiteboard. With reference to FIG. 4, a retainer 32 can be used to retain the holder 10 when it is not in use.

In addition, when not in use, the holder 10 may be placed upside down on a flat surface so that it may rest on its upper eraser portion 16. In this way, the lower portion 14 (which may be positioned above the upper portion 16 while in this orientation) may be inclined downward such that the marker 20 that may be held within the lower portion 14 may also be inclined downward. Note that the tip 22 of the marker 20 may thereby be at a lower elevation with respect to the body of the marker such that the ink within the marker will be pulled downward due to the force of gravity. In this way, the marker 20 and the ink within it may remain in a primed and ready to use configuration while being stored. This may eliminate the need to prop the markers upside down when not in use as may be typically done.

In one preferable implementation, the holder 10 may be formed of a plastic, metal, other types of materials and any combination thereof. In addition, the eraser 30 can be attached to the holder (e.g., to the upper portion 16) by any type of attachment method(s) or mechanisms, including but not limited to, an adhesive, screws, staples, clips, latches, magnets or any other type of attachment means. The eraser 30 may also be removably attached to the holder 10 using fasteners such as hook-and-loop fasteners (not shown), snaps, magnets or other types of attachment mechanisms. The eraser 30 can be made of foam, a felt material, or any other material suitable for erasing the marker ink from a whiteboard. As also illustrated in FIGS. 1-4, the holder 10 preferably has a cross-sectional shape that makes it comfortable for a user to hold while writing on a board (e.g., the lower portion 14 may be generally include a round or circular cross section or holding area).

In another exemplary embodiment hereof as shown in FIGS. 1A and 1B, the holder 10 may include a main body 12, a lower portion 14 with a lower portion cavity or opening 18 into which the marker 20 may be received and held, and an upper portion 16 with an upper portion cavity or opening 34 into which the marker 20 may be received and held. In this way, the holder 10 may include at least two openings or cavities 18, 34 that may receive and hold the marker 20. FIG. 1A shows the marker 20 received and held in the cavity 18 in the lower portion 14, and FIG. 1B shows the marker 20 received and held in the cavity 34 in the upper portion 16. The upper portion 16 may also be configured with an eraser 30 as described above.

The marker 20 may be held in the lower portion cavity 18 and/or the upper portion cavity 34 by pressure fit, detents, tabs, latches or other types of attachment mechanisms and/or methods, and any combination thereof.

In one exemplary embodiment hereof, when the marker 20 may be configured with the upper portion cavity 34, the user of the holder 10 may grasp the lower portion 14 of the holder to write with the marker 20. In this way, with the marker 20 in the upper cavity 34, the longitudinal axis A of the marker 20 may be at an inclined angle θ with respect to the longitudinal axis B of the lower portion 14 as shown. Thus, as the user may use the marker 20 to write upon the generally vertical whiteboard, the marker 20 may be held by the holder 10 at an inverted position. That it, the marker's tip 22 may be in contact with the surface of the whiteboard and the marker's body 36 may be upwardly inclined and extending upward. In this way, the ink within the marker 20 may continue to flow downward (e.g., due to the force of gravity) to the marker's tip 22 such that the user may continually write with the marker 20 without the marker's tip 22 becoming dry.

Note that the user may configure the marker 20 in the lower portion 14 or in the upper portion 16 as desired. For example, a user may begin using the holder 10 configured with a marker 20 in the lower portion 14. Then, if the tip 22 of the marker 20 begins to become dry (e.g., due to the fact that the marker 20 may not be at an inclined orientation and that the ink within the marker 20 may not be flowing downward to the tip 22 of the marker 20), the user may remove the marker 20 from the lower portion 14 and install the marker 20 into the upper portion 16. In this configuration the marker 20 may be configured at an inclined angle as the user uses the holder 10 (e.g., by grasping the lower portion 14 of the holder 10) to write on the whiteboard, thereby facilitating the ink within the marker 20 to flow to the tip 22 of the marker 20 due to the force of gravity.

The holder 10 may also include a marker cap holder 38 that may hold the cap 28 of the marker 20 while the marker 20 may be in use. In one preferred implementation, the marker cap holder 38 may be positioned on the end 27 of the holder 10 longitudinally opposite the end of the holder 10 through which the tip 22 of the marker 20 may protrude. The marker cap holder 38 may include an opening or hole that one end of the cap 28 may pressure-fit into, a tab upon which the marker cap 28 may snap onto, or any other attachment mechanism that may secure the cap 28 to the holder 10.

In one exemplary embodiment hereof, the holder 10 may receive and hold one marker 20, either in the lower portion cavity 18 or in the upper portion cavity 34. In another exemplary embodiment hereof, the holder 10 may receive and hold two markers 20, with one marker received and held in the lower portion cavity 18 and a second marker received and held in the upper portion cavity 34. In this scenario, the upper portion cavity 34 and/or the lower portion cavity 18 may include sufficient length and/or volume so that the first and second markers 20 may not obstruct with one another while configured with the holder 10. In addition, with two makers 20 held by the holder 10 as described, either the tip 22 of the first marker 20 or the tip 22 of the second marker 20 may be chosen to extend through the hole 24 to be used to write. The marker 20 that may not be chosen to extend through the hole 24 may be held in a position that may not obstruct the marker 20 that may extend through the hole 24 (e.g., the marker not extending through the hole 24 may be positioned slightly back from the end 26 of the holder 26).

It is understood by a person of ordinary skill in the art upon reading this specification that the holder 10 may be configured to receive and hold any number and/or type of markers 20, and that the scope of the holder 10 is not limited by the number or types of markers 20 that it may receive and hold at any time.

In another exemplary embodiment as shown in FIGS. 5-7, a dry-erase marker holder 100 of the present invention may include a body 112 having a lower portion 114 and an upper portion 116. The upper portion 116 of the dry marker holder 100 may include a dry marker eraser 130, and the lower portion 114 may receive and retain a dry-erase marker 120 whose tip 122 may extend through an opening 124 at the end 126 of the lower portion 114. The lower portion 114 may also include an opening 118 (e.g., barrel-like cylindrical opening or other shaped opening) into which the dry-erase marker 120 may be received, fitted and retained. The opening 18 may preferably be configured with the upper surface of the lower portion 114 of the holder 100. In this way, the holder 100 may be a top-loading holder. However, it is understood that the opening 118 may be configured with any surface or combinations of surfaces of the holder 100.

In another exemplary embodiment hereof as shown in FIGS. 8-10, a dry-erase marker holder 200 may include a body 212 having a lower portion 214 and an upper portion 216. The upper portion 216 of the dry marker holder 200 may include a dry marker eraser 230, and the lower portion 216 may receive and retain a dry-erase marker 220 whose tip 222 may extend through an opening 224 at the end 226 of the lower portion 214. The holder 200 may include an opening 218 (e.g., a barrel-like cylindrical) into which the dry-erase marker 220 may be received, fitted and retained. In this embodiment, the opening 218 may be accessible from the lower side of the lower portion 214, as illustrated in FIG. 10. In this way, the holder 200 may be a bottom-loading holder.

Turning now to FIGS. 11-13 and FIGS. 14-16, alternative embodiments of a holder 300, 400 respectively are shown to illustrate additional ways in which the invention may be designed and made. For example, the size and shape of the eraser in the holder 300 may be narrower as compared to the eraser in the prior embodiments.

In another exemplary embodiment hereof as shown in FIGS. 17-20, a holder 500 may include a body 512, a lower portion 514 and an upper portion 516. A marker 520 may be housed in a cavity or opening 518 (e.g., a barrel-like opening) formed in the lower portion 514, and the marker 520 may be inserted into the opening 518 through an opening 524 formed in the end 526 of the lower portion 514. Note that while the figures show the opening 524 configured with the front end 526 of the holder 500, the opening 524 may also be configured with the back end 528 of the holder 500. As with the other embodiments, the upper portion 516 may retain an eraser 530.

In another exemplary embodiment hereof as shown in FIGS. 21-23, a holder 600 may include a body 612, a lower portion 614 and an upper portion 616. The upper portion 616 may include an upper portion cavity or opening 618 that may receive and hold a marker 620. The lower portion 614 may include a holding portion 632 whose longitudinal axis C may be configured at an angle $\phi$ with respect to the longitudinal axis D of the marker 620 that may be held in the upper portion cavity 618. In this way, as the user may hold the holding portion 632 of the holder 600 and use the marker 620 to write upon the generally vertical whiteboard, the marker 620 may be held by the holder 600 at an inverted position. That it, the marker's tip 622 may be in contact with the surface of the whiteboard and the marker's body 634 may be upwardly inclined and extending upward. In this way, the ink within the marker 620 may continue to flow downward (e.g., due to the force of gravity) to the marker's tip 622 such that the user may continually write with the marker 620 without the marker's tip 622 becoming dry.

In another exemplary embodiment hereof as shown in FIGS. 24-26, a holder 700 may include a body 712, a lower portion 714 and an upper portion 716. The lower portion 714 may include a gripping portion 750 that may generally receive, grip and secure at least a portion of the circumference of the marker 720. At least a portion of the gripping portion 750 may include a portion (e.g., a channel) that may receive and hold at least a portion of the circumference of the marker 720 by pressure fit, detents, tabs, bands, other attachment mechanisms and any combination thereof. In this way the marker 720 may be held secure by the gripping portion 750. At least a portion of the gripping 750 may extend about a portion of the circumference of the marker 720, and/or around the entirety of the circumference of the marker 720. If at least a portion of the gripping portion may extend around the entirety of the circumference of the marker 720, it may resemble the lower portion 14 with an internal cavity or opening 18 (e.g., a barrel-like cavity) as described in other sections with reference to FIGS. 1-4.

As shown, the gripping portion 750 may be attached to the upper portion 716 by one or more support arms 718 (e.g., one support arm 718 as shown). The upper portion 716 may secure and hold the eraser 730. In this embodiment, a user of the holder 700 may grasp the holder 700 by gripping the pen 720 and/or the gripping portion 750 to write, and by rotating his/her wrist and/or arm may use the eraser 730 to erase.

In another exemplary embodiment hereof as shown in FIGS. 27-30, a holder 800 may include a body 812, a lower portion 814 and an upper portion 816. The lower portion 814 may include a gripping portion 850 that may generally receive, grip and secure at least a portion of the circumference of the marker 820. The gripping portion 850 may include a portion (e.g., a channel) that may receive and hold at least a portion of the circumference of the marker 820 by pressure fit, detents, tabs, bands, other attachment mechanisms and any combination thereof. In this way the marker 820 may be held secure by the gripping portion 850. As shown, the gripping portion 850 may be attached to the upper portion 816 by one or more support arms 818 (e.g., two support arms 818 as shown). The upper portion 816 may secure and hold the eraser 830. In this embodiment, a user of the holder 800 may grasp the holder 800 by gripping the pen 820 and/or the gripping portion 850 to write, and by rotating his/her wrist and/or arm may use the eraser 830 to erase.

In another exemplary embodiment hereof as shown in FIGS. 31-34, the holder 900, 1000, 1100 respectively may each include a rotation element 960, 1060, 1160 that may allow the upper portions 914, 1014, 1114 to rotate with respect to the lower portions 916, 1016, 1116 respectively. In this way, a user may adjust the relative angles between the upper portions 914, 1014, 1114 and the lower portions 916, 1016, 1116 respectively. The angle adjustment may provide ergonomic benefits such that each user may set the angle for the most comfortable use of the device, as well as compactness for storage of the device when not in use or for travel.

In one exemplary embodiment of this type as shown in FIG. 31, the holder 900 may include a pivot element 960 (e.g., a hinge), a tail 962 (e.g., an arc shaped tail) and an adjustment member 964 (e.g., a knob, thumbscrew, nut, bolt, etc.) that may lock or otherwise tighten the pivot element 960 at a fixed setting. The tail 962 may extend from the upper portion 914 to the lower portion 916 as shown. The tail 962 may be secured to the upper portion 914 and engage the lower portion 916 through a slot, hole or channel in the lower portion 916, or conversely, the tail 962 may be secured to the lower portion 916 and engage the upper portion 914 through a slot, hole or channel in the upper portion 916. When engaging the lower portion 916 and/or the upper portion 914, the tail 962 may engage the slot, hole or channel via friction, ratchets, notches, pressure fit, or other methods that may generally hold the tail 962 within the slot, hole or channel.

In addition, the adjustment member 964 may be configured with the pivot element 960 and may be set (e.g., by rotating) to tighten and/or loosen the pivot element 960. As such, the adjustment member 964 may be set to allow the pivot element 960 to rotate (e.g., by loosening the knob 964), or the adjustment member 964 may be set to lock or otherwise at least somewhat inhibit the pivot element 960 from rotating (e.g., by tightening the knob 964). Accordingly, a use of the holder 900 may loosen the adjustment member 964 and pivot the lower portion 916 about the pivot element 960 with respect to the upper portion 914 to set the desired angle between the upper and lower portions 914, 916. Once set to a desired angle, the adjustment member 964 may be tightened to lock the pivot element 960 and the upper and lower portions 914, 916 in place. When the user of the holder 900 may wish to store or otherwise configure the holder 900 to be smaller and more compact (e.g., for storage in a carrying case), the user may loosen the adjustment element 964 and collapse the upper portion 914 and the lower portion 916 together.

In another exemplary embodiment of this type as shown in FIG. 32, the holder 1000 may include a pivot element 1060 and a ratchet element 1070. The holder 1000 may also include an adjustment device 1064 configured with the pivot element 1060 as necessary. This embodiment may be similar to the embodiment shown in FIG. 31 but with the ratchet element 1070 replacing the tail element 962. The ratchet element 1070 may include a bar element 1072 that may include a set of angled teeth along its length, and a pawl or cog element 1074 that may engage the angled teeth on the bar 1072. The bar element 1072 may be secured to the upper portion 1014 and extend to the cog element 1074 that may be configured with the lower portion 1016, or conversely, the bar element 1072 may be secured to the lower portion 1016 and extend to the cog element 1074 that may be configured in the upper section 1014.

During use, the free end of the bar element 1072 may be inserted into the cog element 1074 to a distance that sets the desired angle between the upper portion 1014 and the lower portion 1016. During this insertion, the cog element 1074 may ratchet along the length of the bar 1072 while engaging each sequential tooth on the bar 1072. Once the desired angle is set, the cog 1074 may hold the bar 1072 in place. It may also be preferable to tighten the adjustment element 1064 to lock the pivot element 1060 as necessary. To disengage the bar 1072 from the cog 1074, the bar 1072 may be pressed into the cog 1074 until the cog 1074 may release the teeth on the bar 1072. This setting may also collapse the upper portion 1016 and the lower portion 1014 together into a compact state. To reset the angle between the portions 1014, 1016, the bar element 1072 may be removed from the cog element 1074 and the process may be repeated.

In another exemplary embodiment hereof as shown in FIG. 33, the holder 1100 may include an upper portion 1114, a lower portion 1116, a pivot element 1160 and an adjustment member 1164. In this embodiment, the angle between the upper and lower portions 1114, 1116 may be set and locked through use of the adjustment member 1064. In this embodiment, the holder 1100 may not include a tail or a ratchet mechanism but may instead rely only on the pivot element 1160 to hold the upper and lower portions 1114, 1116 together and at a desired angle.

In all of the above described embodiments of FIGS. 31-33, the upper portions 914, 1014, 1114 and/or the lower portions 916, 1016, 1116 respectively may include one or more eraser elements and/or one or more marker compartments as described in relation to the other exemplary embodiments described herein.

In another exemplary embodiment hereof as shown in FIG. 34, the holder 200 may include a "comfort grip" 280 as illustrated. The comfort grip 280 may include a layer of rubber, silicon, foam or any other, preferably soft, material or combinations of materials. The comfort grip 280 may generally encompass the lower portion 216 (e.g., the grip portion) and/or the upper portion 216 as required. The comfort grip 280 may provide a comfortable surface on the holder 200 that may be gripped by the user during use.

In another exemplary embodiment hereof as shown in FIG. 35, the holder 1200 may include a body 1212, a lower portion 1214, an upper portion 1216 and a stylus 1220 that may include a stylus tip 1222. As is known in the art, a stylus 1220 may be used to write upon electronic touchscreen displays and/or monitors, upon interactive whiteboards, other types of touch sensitive devices (e.g., active mouse pads) and any combination thereof.

The stylus 1220 may be integrated into the lower portion 1214 (or the upper portion 1216 where applicable) as a single unit (e.g., may be manufactured with lower portion 1214 together), or may be removable from the lower portion 1214 and/or interchangeable. If the stylus 1220 may be removable and/or interchangeable, the holder 1200 may include any and/or all of the aspects described in other embodiments regarding how the markers 20, 120, 220, 520, 620, 720, 820 may be configured with the holders 10, 100, 200, 500, 600, 700, 800 respectively, with the aspects now pertaining and applied to the holder 1200 and the stylus 1220.

The stylus 1220 may be passive and/or active, and if active, the holder 1200 and/or the stylus 1220 may include a power supply (e.g., a rechargeable and/or replaceable battery).

The stylus 1220 may also include additional electronic functionalities that may be controlled by one or more control devices 1280, 1282 (e.g., buttons, knobs, dials, etc.) located on the holder 1200. For example, when in use with a whiteboard, the stylus 1220 may provide a cursor on the whiteboard that may be activated to interact with the whiteboard (preferably an interactive whiteboard). The cursor may be formed when the tip 1222 of the stylus 1200 may be in contact with the surface of the whiteboard or otherwise (e.g., the stylus 1220 may communicate with the whiteboard by other means such as infrared, Wi-Fi, Bluetooth or other communication protocols and technologies).

In one example, the stylus 1220 may be used to choose or activate an element on the whiteboard (such as text, an application icon, a dialog button, a drop-down menu, etc.). In one preferred implementation, the activation may be triggered through the use of one or more buttons 1280 and/or dials 1282 on the holder 1200. The buttons 1280 and/or dials 1282 may be used to perform interactive functionalities such as left-mouse clicks, right-mouse clicks, scrolling, highlighting, opening menus, make selections, other types of interactive functionalities and any combinations thereof.

In another example, the buttons 1280 and/or dials 1282 may be used to adjust aspects of the stylus 1220 such as the tip size, the tip type (e.g., writer, eraser, etc.), the type of cursor formed on the whiteboard, the eraser type, other aspects of the stylus and any combinations thereof.

In another exemplary embodiment hereof as shown in FIG. 35, the holder 1200 may include a body 1212, a lower portion 1214 and an upper portion 1216, and the upper portion may include eraser elements 1230-1, 1230-2, . . . 1230-*n* (collectively and individually 1230). The eraser elements 1230 may be individually distinct from one another, may be formed together as a continuous element, and any combination thereof. In addition, the eraser elements 1230 may be positioned at the same or different locations and/or orientations with respect to one another and the holder 1200. For example, as shown in FIG. 35, eraser element 1230-1 may be oriented at a different angle $\Omega$ with respect to the holder 1200 compared with the orientation of the eraser element 1230-2. In addition, eraser element 1230-1 may be located towards the front of the upper portion 1216 and eraser element 1230-2 may be located towards the back of the upper portion 1216. It is clear that the different eraser elements 1230 may be positioned at any location on the holder 1200 and in any orientation, and that the locations and/or orientations of the different eraser elements 1230 need not match.

In addition, the shapes and sizes of each eraser element 1230 may be the same, similar or different compared to the other eraser elements 1230. For example, as shown in FIG. 35, the eraser element 1230-2 may have a wider surface area compared to the eraser element 1230-1, and the eraser element 1230-1 may have a narrower profile.

The different sizes and shapes, and different locations and orientations of each eraser element 1230 may provide different benefits and uses for each eraser 1230. For example, the wider surface area of the eraser element 1230-2 may allow it to be used for large scale erasing (where accuracy of the erasing may not be of critical importance). In addition, the narrower profile of the eraser element 1230-1 may allow it to be used for more accurate and precise erasing.

Additionally, the angles of orientation of the different eraser elements 1230 may provide benefits for the use of each element 1230. For example, the lower angle of the eraser element 1230-2 may be more ergonomic for providing large scale erasing, while the sharper angle of the eraser element 1230-1 may be more ergonomic for providing more accurate and precise erasing.

It is understood by a person of ordinary skill in the art, upon reading this specification, that any number of eraser elements 1230 may be provided with the holder 1200, and that the eraser elements 1230 may be located at any positions and at any orientations with respect to one another and the holder 1200. It is also understood that eraser elements 1230 may be of any shape and/or size, and of any combinations of shapes and/or sizes. It is also understood that the scope of the holder 1200 is not limited in any way by the number of eraser elements 1230 it may include, nor by the size, shape, location and/or the orientation of any of the eraser elements 1230.

In another exemplary embodiment hereof, the eraser element(s) 1230 may include one or more different types of eraser elements 1230. For example, as shown in FIG. 36, the eraser element 1230 may include a first eraser element 1230A, a second eraser element 1230B and a third eraser element 1230C. In one exemplary embodiment hereof, the eraser elements 1230 may include different types of eraser materials (e.g., felts, foams, etc.) and/or different characteristics (e.g., textures, stiffnesses, etc.). For example, the first eraser element 1230A may include a first material that may include a soft felt material, the second eraser element 1230B may include a second material that may be include a stiff felt material, and the third eraser element 1230C may include a material that may include a medium stiff foam material. In this example, the middle section eraser 1230B may be used for erasing heavy ink marks that may require extra force, while the first and/or third eraser elements 1230A, 1230B may be used for lighter ink marks that may not require as much force to remove. In another example, the middle section eraser 1230B, being stiffer for example, may remove the ink from the whiteboard, but may not capture or absorb the ink particles once the ink has been removed from the board. In this case, the left and/or the right eraser sections 1280A, 1280C may then be soft enough to capture and absorb the ink particles, thus fully removing them from the board.

In another exemplary embodiment hereof, the different eraser elements 1230A, 1230B, 1230C may at the same surface level (as shown in FIG. 35B which is taken from the perspective of cut-lines E-E of FIG. 35A) or may be configured at different surface levels (as shown in FIG. 35C which is taken from the perspective of cut-lines E-E of FIG. 35A). The different levels may affect the amount of force that may be inflicted onto the whiteboard by the eraser 1230 (e.g., the center section eraser element 1230B may inflict more pressure upon the surface of the whiteboard compared to the left and right section eraser elements 1230A, 1230C).

It is understood by a person of ordinary skill in the art that the above examples are meant for demonstration and that the eraser 1230 may include any number of different eraser elements 1230A, 1230B, . . . 1230N, that may include any types or combinations of types of any number of materials, that may be configured in any position and/or in any orientation with respect to one another and with respect to the holder 1200, and that may be configured at the same or at different surface levels compared to one another. It is also understood that the scope of the holder 1200 is not limited in any way by the number, the materials, the orientations, the positions or the surface levels of the eraser elements 1230 that the holder 1200 may include.

In any of the embodiment described herein or otherwise, the eraser elements 30, 130, 230, 530, 630, 730, 830, 930, 1030, 1130, 1230 may be removably attached to the holders 10, 100, 200, 500, 600, 700, 800, 900, 1000, 1100, 1200 respectively. That is, the eraser elements 30, 130, 230, 530, 630, 730, 830, 930, 1030, 1130, 1230 may be removed by disengaging the eraser elements 30, 130, 230, 530, 630, 730, 830, 930, 1030, 1130, 1230 from their respective holders 10, 100, 200, 500, 600, 700, 800, 900, 1000, 1100, 1200 and replaced by engaging eraser elements 30, 130, 230, 530, 630, 730, 830, 930, 1030, 1130, 1230 onto their respective holders 10, 100, 200, 500, 600, 700, 800, 900, 1000, 1100, 1200.

The eraser elements 30, 130, 230, 530, 630, 730, 830, 930, 1030, 1130, 1230 may be removably secured to their respective holders 10, 100, 200, 500, 600, 700, 800, 900, 1000, 1100, 1200 using hook and loop material, snaps, releasable adhesive (e.g., peel and stick), magnets, clips, latches, slides, any other type of attachment mechanisms and any combination thereof. In this way, the eraser elements 30, 130, 230, 530, 630, 730, 830, 930, 1030, 1130, 1230 may be replaced when they may become worn, dirty or otherwise in need of replacement.

In one preferred implementation of this as shown in FIG. 34, the holder 200 may include hook and loop fasteners 282, 284 respectively that may be generally configured between the eraser 230 and the upper portion 214 to secure the eraser element 230 in place. In this way, the eraser 230 may be readily removed and replaced, as desired.

In any of the embodiments described herein or otherwise, the holder may include one or more laser pointers.

In any of the embodiments described herein or otherwise, the holder may include one or more magnets (or other types of attachment mechanisms) that may secure the holder to the whiteboard when not in use.

In any of the embodiments described herein or otherwise, the holder may include a container (internal, external or any combination thereof) that may include erasing fluid. The container may include a release mechanism, preferable activated by a button, that may release a predefined amount of eraser fluid onto the holder's eraser(s) and/or the whiteboard to facilitate erasing of marker ink.

In any of the embodiments described herein or otherwise, the holder may be configured with any type of maker including but not limited to: standard size markers, slim sized markers, small markers, large markers, medium size markers, any type of marker and any combination thereof.

It is understood that any aspects described in relation to any of the embodiments described herein may also apply and pertain to any other of the embodiments described.

Those of ordinary skill in the art will appreciate and understand, upon reading this description, that embodiments hereof may provide different and/or other advantages, and that not all embodiments or implementations need have all advantages.

In addition, a person of ordinary skill in the art will understand, that any method described above or below and/or claimed and described as a sequence of steps is not restrictive in the sense of the order of steps.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A device adapted to hold one or more accessories, the device comprising:
    a body with an upper portion and a lower portion;
    one or more erasers configured with the upper portion; and
    a first holding element configured with the lower portion, the first holding element including a front end, a back end opposite the front end and a cavity extending between the front end and the back end, the cavity configured to hold a first writing device, the back end configured to block a back end of the first writing device, and the back end of the first holding element including a cap holder located outside the cavity and adapted to hold a writing tip cap associated with the first writing device.

2. The device of claim 1 further comprising a second holding element configured with the upper portion wherein the second holding element is adapted to hold the first writing device and/or one or more second writing devices.

3. The device of claim 2 wherein a longitudinal axis of the second holding element is offset by a second angle from the longitudinal axis of the lower portion.

4. The device of claim 1 wherein the one or more erasers includes at least one whiteboard eraser, and the first writing device includes at least one whiteboard marker.

5. The device of claim 1 wherein a longitudinal axis of at least one of the one or more erasers is offset by a first angle from the longitudinal axis of the first holding element.

6. The device of claim 5 wherein when the device is placed eraser side down on a surface, the at least one of the one or more writing devices is at an inclined angle.

7. The device of claim 1 wherein the one or more erasers includes a total of two eraser portions wherein the first eraser portion includes an angular offset compared to the second eraser portion.

8. The device of claim 1 wherein at least one of the one or more writing devices includes at least one stylus.

9. The device of claim 1 further comprising a pivot element configured between the upper portion and the lower portion, wherein the upper portion and/or the lower portion are adapted to pivot about the pivot element.

10. The device of claim 1 wherein at least one of the one or more erasers is removably configured with the upper portion.

11. The device of claim 1 further comprising an eraser fluid tank.

12. The device of claim 1 further comprising a laser pointer.

13. The device of claim 1 wherein the front end includes an opening through which a writing tip of the first writing device may extend.

14. The device of claim 1 wherein the one or more erasers includes at least one flat surface.

15. The device of claim 1 wherein the cap holder is located opposite the front end.

16. The device of claim 1, wherein the cap holder is adapted to removably hold the writing tip cap associated with the first writing device.

17. A device adapted to hold one or more accessories, the device comprising:
    a body with an upper portion and a lower portion;
    one or more erasers configured with the upper portion; and
    a first holding element configured with the lower portion, the first holding element including a front end, a back end opposite the front end and a cavity extending between the front end and the back end, the cavity including a side opening configured to receive a first writing device, the front end configured to block a tip end of the first writing device, and the back end configured to block a back end of the first writing device;

wherein the front end includes an opening through which a writing tip of the first writing device may extend, and the back end of the first holding element includes a cap holder adapted to hold a writing tip cap associated with the first writing device.

18. The device of claim 17 wherein a longitudinal axis of at least one of the one or more erasers is set at an incline with respect to the longitudinal axis of the first holding element.

19. The device of claim 17 further comprising a second holding element configured with the upper portion and configured to hold a second writing device.

20. A device adapted to hold one or more accessories, the device comprising:

a body with an upper portion and a lower portion;

one or more erasers configured with the upper portion; and a first holding element configured with the lower portion, the first holding element including a front end, a back end opposite the front end and a cavity extending between the front end and the back end, the cavity adapted to receive a first writing device, and the back end configured to block a back end of the first writing device;

wherein the front end includes an opening through which a writing tip of the first writing device may extend, and the back end of the first holding element includes a cap holder located outside the cavity and adapted to hold a writing tip cap associated with the first writing device.

\* \* \* \* \*